United States Patent Office 3,342,210
Patented Sept. 19, 1967

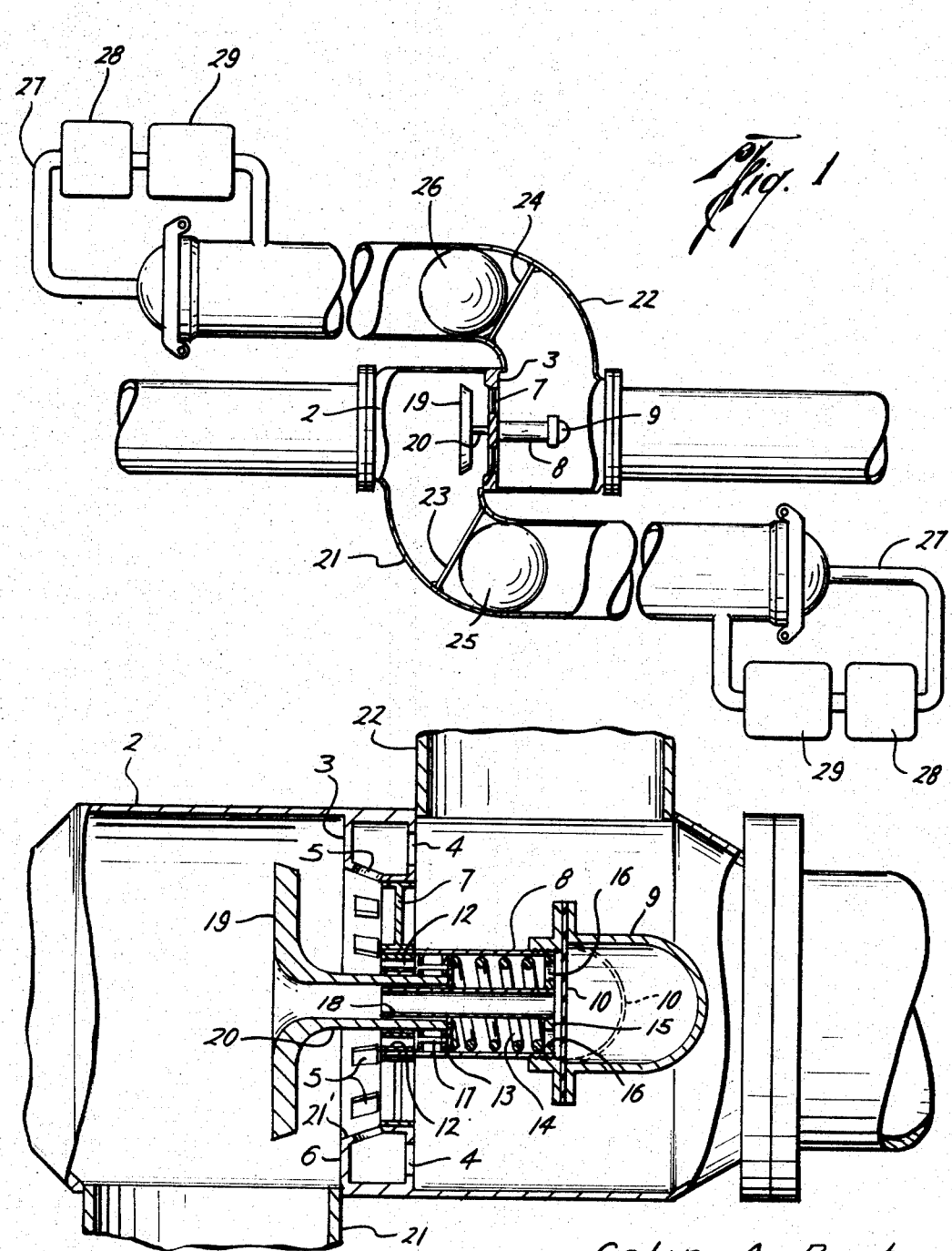

3,342,210
SURGE SUPPRESSOR
Colin A. Renton, 817 W. Heisse St.,
Alvin, Tex. 77511
Filed June 22, 1964, Ser. No. 376,783
9 Claims. (Cl. 137—593)

This invention relates to new and useful improvements in a surge suppressor.

It is an object of this invention to provide means for suppressing the surge in a pipe line caused by resistance to the flow, such as closing a valve, or the like, and thus setting up a reverse shock wave against the flow direction in the pipe line, which often causes severe damage to pumps and other equipment in the line.

In pipe lines, particularly in the lines of large diameter, the kinetic energy build-up developed by the weight of the fluid in motion in a downstream direction and the generation of high speed shock waves in an upstream direction against the direction of flow caused by sudden restrictions of flow or in encountering higher pressure from another source, such as in the junction of two lines, often causes damage to the pipe line equipment. These shock waves are generated in a number of ways, such as by closing a valve against the downstream flow, or by switching the point of inlet, or many other ways of creating a resistance to the direction of flow. It is an object of this invention to provide means for absorbing or dampening this shock to prevent damage to the pumping equipment and other equipment in the line.

Under the present methods of pipe line operation, particularly in large diameter pipe, the wall thickness of the pipe experiences a normal stress of seventy percent of its yield point. Consequently when a pressure is exerted that exceeds this seventy percent of yield point, which often occurs for many reasons, the pipe actually expands under this pressure, and when the pressure is relieved, the pipe contracts, returning to its normal diameter, and the squeeze on the product in the pipe line caused by this contraction, will send shock waves through the product in both directions, often of greater force than the force which the equipment in the pipe line is designed to withstand. When these shock waves reach a resistance, they bounce back, and upon return collide with great force. This reciprocal action of the shock waves continues until the shock wave dissipates. It is an object of this invention to provide a device that may be mounted at intervals in the pipe line to absorb such shocks automatically, as they occur, eliminating the damage to the pipe line equipment from said shocks and generally promoting a smoother transmission of pipe line products.

Another object of the invention is to isolate the type of shock waves traveling downstream from those traveling upstream.

Another object of the invention is to provide novel means for diverting shock waves in a moving pipe line component and absorbing the shock wave thus diverted by means of an inert gas, and returning the fluid so diverted upon restoration of normal flow pressure in the pipe line.

With the above and other objects in view, the invention has relation to certain novel features of construction, operation nad arrangement of parts more particularly defined in the following specifications and illustrated in the accompanying drawings, wherein:

FIGURE 1 is a side elevational view of the device, in cross section, and

FIGURE 2 is an enlarged side elevational cross sectional view of the surge valve shown in open position.

Referring now more particularly to the drawings, the numeral 1 designates a pipe line having the enlarged chamber 2 on the inside wall of which is mounted the hollow peripheral flange 3 having the openings 4, 4 at spaced intervals on the upstream side and the openings 5, 5 on the downstream side. The end wall of the flange on the downstream side is inclined forming the valve seat 21'. A spider 7 extends from the flange 3 to the cylinder 8 which is mounted in the axes of the spider 7, and axially with the pipe line being served. The extended end of the cylinder 8 is externally threaded and the diaphragm support and surge chamber 9 are mounted thereon. The diaphragm 10 is of yieldable material, such as rubber or neoprene and the chamber 9 is filled with a suitable inert gas, such as nitrogen, having a suitable pressure such as fifty pounds per square inch in a thirty six inch line, matching the line pressure at the point of installation.

A bearing is mounted in one end of the cylinder 8, and has a plurality of transverse ports 12, 12 leading into the cylinder 8. A piston 13, in the cylinder 8, bears against the coil spring 14, which in turn abuts against the end wall of the cylinder 8, said end wall, 15, having the transverse passageways 16, 16 therein. Suitable check valves 17, 17 are mounted in the piston 13, which are closed by the force of the fluid passing through the ports 12, 12, but will open to relieve the pressure in the cylinder when the flow downstream has been restored. The valve guide 18 is mounted axially in the cylinder 8 and is tubular. The valve head 19 is of the same diameter as the inside diameter of the pipe line being served, and has a tubular stem 20 which telescopes over the guide 18. The valve head has an inclined peripheral face which seats on the valve seat 21', partially blocking the ports 5. The piston 13 is mounted on the extended end of the valve stem 20 in the cylinder 8.

On each side of the valve assembly is a diversion surge chamber 21, 22, each having a valve seat as 23, 24. The respective chambers 21, 22 are the same inside diameter as the inside diameter of the pipe line being served, and ball valves, as 25, 26, preferably formed of rubber with a solvent resistant plastic coating, normally abut the seats 23, 24, respectively, and are adapted to yield to move in the chambers 21, 22, maintaining a tight seal at all times. The inside walls of the chambers 21, 22 are lined with an epoxy resin coating to reduce friction as the valve 25 and the valve 26 move longitudinally in the chambers. The chambers 21, 22 are filled with an inert gas of sufficient pressure to maintain the ball valves 25, 26 in place against the seats 23, 24 against the normal flow pressure of the fluid in the pipe line. A pipe line 27 leads axially from the extended end of the respective lines 21, 22 into a pressure generator 28 and from the generator 28 into the volume tank 29 and from the tank 29 into the respective chambers 21, 22 adjacent the extended ends thereof.

In a thirty six inch inside diameter pipe line, the enlarged chamber 2 will be of a forty eight inch inside diameter, and the chambers 21, 22 will be of thirty six inch diameter, with a capacity of approximately twenty barrels each. As a shock producing resistance is encountered, and a shock wave or pressure surge moves upstream, the initial shock will flow through the stem 20 and against the diaphragm 10, and against the pressure of the gas in the surge chamber 9, and when the pressure against the face of the valve head 19 is greater than that of the spring 14, it will force the valve 19 into seating position in the flange 3 against the pressure of the spring 14 and as the valve moves into closed position, the upstream pressure will be diverted into the chamber 21, against the ball 25, moving the ball 25 against the gas in the chamber 21 until the pressure of the compressed gas and the upstream pressure on the line 21 are in equilibrium.

Any high velocity shock wave originating downstream of the surge suppressor will initially bear against the head of the piston 19, thence through the hollow stem and against the rubber diaphragm 10, causing an enlargement of the diaphragm within the surge chamber 9. The subsequent pressure surge will force the piston head 19 on to the seat 21' compressing the spring 14 in the process. In the closed position, the piston 19 will act as an instantaneous check valve, preventing propagation of the initial shock wave upstream, and thus avoid collision with the equalizing pressure from the discharge side of any pump upstream. The fluid flowing in the line has velocity, and kinetic energy which may be a potential destructive force of great magnitude. As this force may form a secondary shock as it comes in contact with the closed valve, it is diverted into the surge chamber 22, bearing against the rubber ball valve 26, which is yieldingly held in a launching position by inert gas pressure from the pressure generators 28, 29. Liquid from the main pipe line will build up pressure at this point and force the ball along the tubular chamber 22 until pressure in the pipe line and surge chamber are in equilibrium.

If at any time during operation of the surge suppressor, the pressure downstream of the piston becomes less than the upstream pressure, the piston, aided by the compression of the spring, will be lifted off the seat and will allow flow to continue down the main pipe line through ports 4, 5, 12 and between the radial spider supports 7. After the line pressure has dropped to a predetermined point, the pressure on the gas side of the ball valve would automatically build up forcing the ball back into a yieldingly maintained launching position, and in so doing would displace liquid back into the main pipe line.

The surge suppressor herein described may be employed singly in suitable locations in the line, or may be in gangs of multiple units, depending on the force of the shocks experienced. In most instances, at least one unit should be located adjacent the pumping equipment, and in long lines, units should be located at regular intervals in the line.

While the foregoing is considered a preferred form of the invention, it is by way of illustration only, the broad principle of the invention being defined by the appended claims.

What I claim is:

1. In a surge suppressor for pipe lines, a surge chamber within the pipe line of greater diameter than that of the pipe line being served, a valve seat in said surge chamber, a valve mounted in said surge chamber and yieldably maintained in open position adjacent said seat, surge lines in flow connection with said surge chamber upstream and downstream of said seat respectively, ball valves in said surge lines, gas in said surge lines under pressure yieldingly maintaining said ball valves closed against pipe line pressure, means for absorbing the initial shock wave and closing said valve in said surge chamber upon movement of a pressure surge upstream and diversion of liquid flow into said surge lines as a means of absorbing kinetic energy in the moving stream.

2. In a surge suppressor for pipe lines, a surge chamber within the pipe line of greater diameter than that of the pipe line being served, a valve seat in said surge chamber, a valve mounted in said chamber and yieldably maintained in open position adjacent said seat, surge diversion chambers in flow connection with said surge chamber on the downstream and upstream side of said seat respectively, ball valves in said surge diversion chambers, gas in said surge diversion chambers under pressure yieldingly maintaining said ball valves closed against pipe line pressure, means for absorbing the initial shock and closing said valve in said surge chamber upon movement of a pressure surge upstream and diversion of pressure flow into said surge diversion chambers and means for resisting the movement of fluid into said surge diversion chambers, absorbing a portion of the force thereof, and means for returning the fluid diverted into said surge diversion chambers back into the pipe line.

3. In a surge suppressing device for pipe lines, a chamber of greater inside diameter than the inside diameter of the pipe line being served, a valve seat in said chamber, a valve mounted in said valve seat having a valve head of the same diameter as the inside diameter of the pipe line being served, a tubular stem on said valve head having one end open to permit inlet of fluid moving upstream, and having a gas filled surge chamber at the other end, a diaphragm between said surge chamber and said valve stem expandable by upstream pressure, yieldable means for maintaining said valve normally in open position and means for permitting down stream flow of fluid through said valve when said valve is in open position and against said surge chamber when said valve is in closed position.

4. In a surge suppressing device for pipe lines, a chamber of greater inside diameter than the inside diameter of the pipe line being served, a valve seat in said chamber, a valve mounted in said valve seat having a valve head of the same diameter as the inside diameter of the pipe line being served, a tubular stem on said valve head having one end open to permit inlet of fluid moving upstream, and having a gas filled surge chamber at the other end, a diaphragm between said surge chamber and said valve stem expandable by upstream pressure, yieldable means for maintaining said valve normally in open position and means for permitting downstream flow of fluid through said valve when said valve is in open position and into said surge chamber when said valve is in closed position, and diversion chambers in the pipe line being served on each side of said valve, ball valves in said diversion chambers, gas under pressure in said diversion chambers normally maintaing said valves closed, said valves being movable rearwardly in said chambers by shock waves in the flow of of the pipe line being served.

5. The device described in claim 4 having means for increasing the pressure of the gas in said diversion chambers to move the fluid therein back into the pipe line and the valves therein back into closed position.

6. The structure defined in claim 4, with the surge diversion chambers having the inside walls thereof lined with an epoxy resin coating to permit anti-friction movement of the ball valves.

7. The structure defined in claim 4 with a means for increasing the gas pressure in the diversion chambers consisting of a generator and a volume storage tank in flow connection with the extended end of the diversion chamber.

8. In a surge suppressing device to be mounted within a pipe line, an enlarged chamber, a hollow flange on the inside wall of said chamber, a valve seat on one face of said flange and a valve supporting spider mounted in said flange, a valve having a valve head and a tubular valve stem reciprocally mounted in said spider, a cylinder axially mounted in said spider and a bearing mounted in one end of said cylinder and through which said valve stem extends, a piston integral with said stem and mounted in said cylinder, a spring bearing against said piston yieldingly maintaining said valve in open position adjacent said seat, a gas filled surge chamber mounted on the other end of said cylinder, a flexible diaphragm mounted between said cylinder and surge chamber, and ports through said flange and through said bearing to provide passageways for fluid in said pipe line into said cylinder when said valve is closed.

9. The device defined in claim 8 having diversion chambers in flow connection with said pipe line, one mounted in said enlarged chamber on each side of said flange to receive downstream and upstream flow, respectively, said diversion chambers having a valve mounted in the inlet end thereof yieldably maintained in closed position by an inert gas pressure.

References Cited

UNITED STATES PATENTS

| | | | |
|---|---|---|---|
| 2,707,002 | 4/1955 | Harris | 138—31 |
| 2,742,928 | 4/1956 | Luzynski | 137—593 |

M. CARY NELSON, *Primary Examiner.*

ALAN COHAN, *Examiner.*

W. R. CLINE, *Assistant Examiner.*